INVENTOR.
KARL GEORG JOHNSON
BY Leech & Radue
ATTORNEYS

Jan. 29, 1952

K. G. JOHNSON 2,583,848

SWITCHING DEVICE FOR THE SETTING OF CROSSBAR SWITCHES BY MEANS OF MARKERS

Filed May 23, 1947

7 Sheets-Sheet 2

INVENTORS
KARL GEORG JOHNSON
BY Leech & Radue
ATTORNEYS

INVENTOR
KARL GEORG JOHNSON
BY
Leech & Radue
ATTORNEYS

Jan. 29, 1952 K. G. JOHNSON 2,583,848

SWITCHING DEVICE FOR THE SETTING OF CROSSBAR SWITCHES BY MEANS OF MARKERS

Filed May 23, 1947 7 Sheets-Sheet 4

INVENTOR
KARL GEORG JOHNSON

BY Leech & Radue
ATTORNEYS

Jan. 29, 1952

K. G. JOHNSON

SWITCHING DEVICE FOR THE SETTING OF CROSSBAR SWITCHES BY MEANS OF MARKERS 2,583,848

Filed May 23, 1947

7 Sheets-Sheet 5

INVENTOR
KARL GEORG JOHNSON

BY

Leech & Radue
ATTORNEYS

Jan. 29, 1952

K. G. JOHNSON 2,583,848

SWITCHING DEVICE FOR THE SETTING OF CROSSBAR SWITCHES BY MEANS OF MARKERS

Filed May 23, 1947

7 Sheets-Sheet 6

INVENTOR
KARL GEORG JOHNSON

BY Leech & Radue
ATTORNEYS

Jan. 29, 1952 K. G. JOHNSON 2,583,848

SWITCHING DEVICE FOR THE SETTING OF CROSSBAR SWITCHES BY MEANS OF MARKERS

Filed May 23, 1947 7 Sheets-Sheet 7

INVENTOR
KARL GEORG JOHNSON
BY Leech & Radue
ATTORNEYS

Patented Jan. 29, 1952 2,583,848

UNITED STATES PATENT OFFICE 2,583,848

SWITCHING DEVICE FOR THE SETTING OF CROSSBAR SWITCHES BY MEANS OF MARKERS

Karl Georg Johnson, Stockholm, Sweden, assignor to Telefonaktiebolaget L M Ericsson, Stockholm, Sweden, a company of Sweden Application May 23, 1947, Serial No. 750,032
In Sweden May 23, 1946

3 Claims. (Cl. 179—22)

Within automatic telephone systems with cross bar switches communications are often set up by the aid of indicating devices, so called markers. Usually there is only one marker in each exchange and only one communication at a time can be set up. By dividing the marker into units, each dealing with the switching operation within only one selection stage, it may be achieved that communications passing through completely different selection stages, may be set up independent of each other. The switching operations within an automatic exchange are divided into definite steps, e. g. the connection of a subscriber's line to a register, the connection of an incoming junction line to a register, the connection of a called subscriber's line with a subscriber's line connected to a register and so on. The marker or its different parts must not be kept busy unnecessarily. If a fault arises at the connection of a communication, the communication can not be locked until the fault has been observed and remedied by the employees of the exchange, but the marker must immediately release the faulty communication and possibly try to set up another.

The present invention has for its purpose partly to change connections, which are coming across a faulty operating bar in a cross bar switch, to another operating bar for cross bar switches in the same selection stage, partly to register dates, by the aid of which faults may be localized.

This is achieved in automatic telephone exchanges with cross bar switches and markers in such a way that a test circuit for each operating bar, over which a communication selected for setting may be established through a selection stage, is connected by the marker to an especial relay device for the selection stage. This device selects a free operating bar for the communication and is connected together with the corresponding relay device for another selection stage, over which the communication may be conducted later on, by the last mentioned relay device being provided with a time device, which is connected when a free operating bar has been selected by the first mentioned relay device. It is again disconnected without having acted upon the setting of the communication, when a free operating bar is selected by the relay device, to which the time device pertains, and which, if actuated, closes a circuit by means of a relay in the first mentioned relay device, thereby causing this to release the operating bar selected in the first selection stage and to select another operating bar for the setting of the communication.

By arranging the selection of a free operating bar in a first selection stage in a known manner, so that only one operating bar, which can reach at least one free operating bar in the next selection stage, may be selected, the time device in the latter selection stage, if actuated, will always indicate a fault, whereby circuits may be arranged from the relay device of the first selection stage to a registering device, so set, that the operating bar selected in the first selection stage, when the time device of the next selection stage was actuated, will be indicated. The invention will be described more closely with reference to the annexed drawings, Figs. 1–9.

Figure 1:
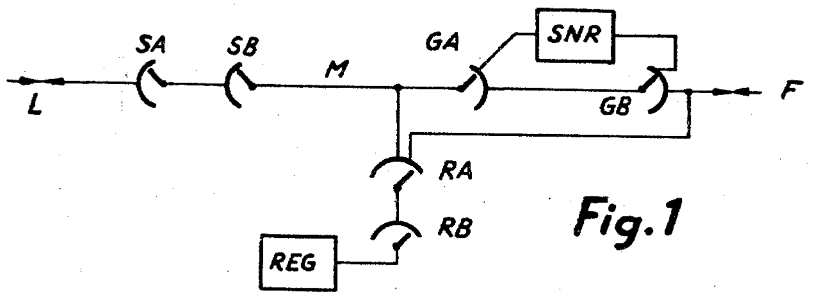
Fig. 1 shows the connection paths within an automatic exchange with cross bar switches.

In Fig. 1 SA are primary and SB secondary selectors for connection of the lines L with the intermediate lines M. The intermediate lines M as well as the junction lines F are connected together with the registers REG over the primary selectors RA and the secondary selectors RB. Group selections are arranged from the intermediate lines M to the lines L and F by means of the primary selectors GA and the secondary selectors GB.

Local calls are connected over two primary selectors GA, of which one is connected with a connecting link SNR being connected to the secondary selectors GB. The following connection paths occur in an exchange according to Fig. 1.

(*a*) From the lines L over SA and SB to M, from M over RA and RB to REG. This switching operation will be described more closely later on and is controlled by the routing relay MR1 in Fig. 3.

(*b*) From the lines F over RA and RB to REG. This switching operation is controlled by the routing relay MR4 in Fig. 3.

(*c*) From the lines F under control of the registers REG over GB and GA, SB and SA to a called subscriber's line L.

(*d*) From the intermediate lines M under control of the registers REG over GA and GB to a connecting link SNR, from SNR over GA to another intermediate line M and from this over SB and SA to a called subscriber's line L.

Figure 3:
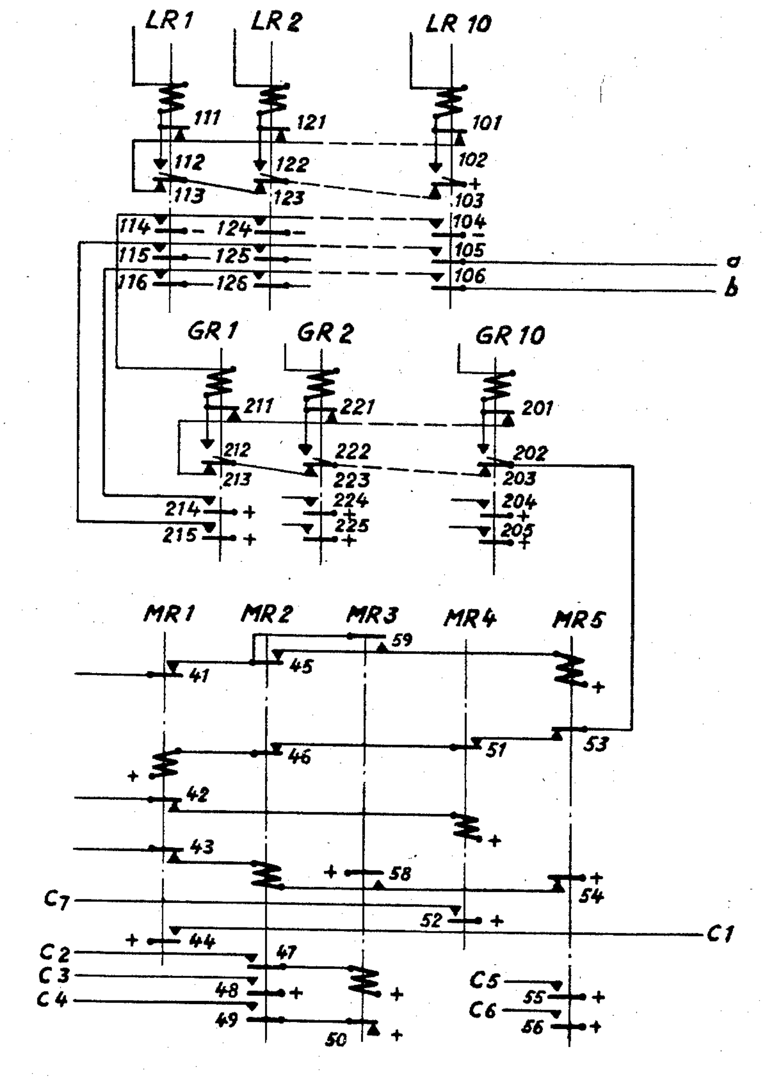
Fig. 3 shows the part of the marker which selects a certain calling subscriber's line for connection to a register.

The switching operations (*c*) and (*d*) are both controlled by the routing relay MR2 in Fig. 3.

(*e*) From the intermediate lines M under control of the registers REG over GA and GB to the lines F. This switching operation is controlled by the routing relay MR5 in Fig. 3.

Figure 2:
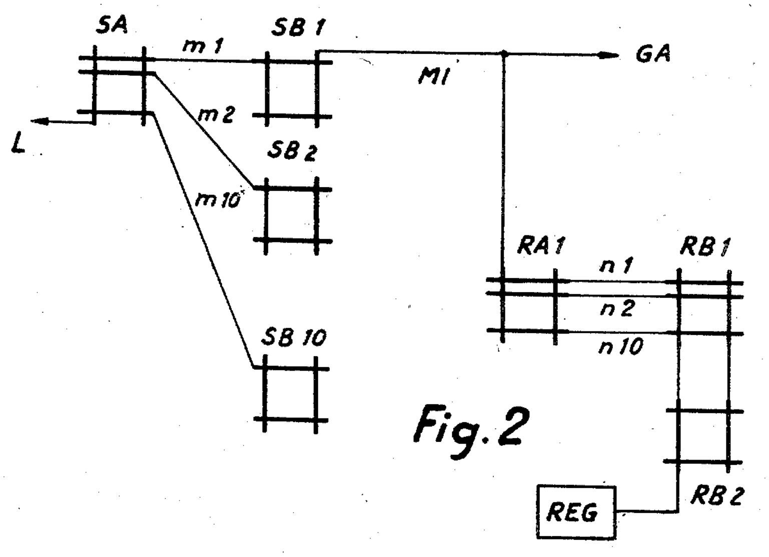
Fig. 2 shows the principle for the connection of the operating bars of a cross bar switch in a connection path running from a subscriber's line L to a register REG.
Figure 9:
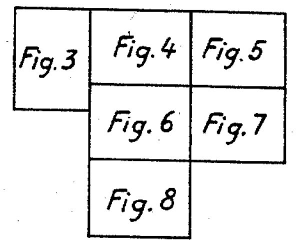
Fig. 9 shows how the drawings, Figs 3–8, should be assembled.

Fig. 2 shows the connection between the operating bars in a primary cross bar switch SA1 and the selecting bars in the secondary cross bar switches SB1—SB10. Each operating bar in the secondary cross bar switches SB1—SB10 is connected to an intermediate line M, of which M1 is shown in the figure, and to a selecting bar in a cross bar switch RA. Each of the operating bars in the selectors RA, of which only RA1 is shown in the figure, is connected to its selecting bar in the selectors RB1—RB2. Each register REG is connected to an operating bar in each of the cross bar switches RB1—RB2, all intermediate lines M thereby having access to all registers REG.

Figure 4:
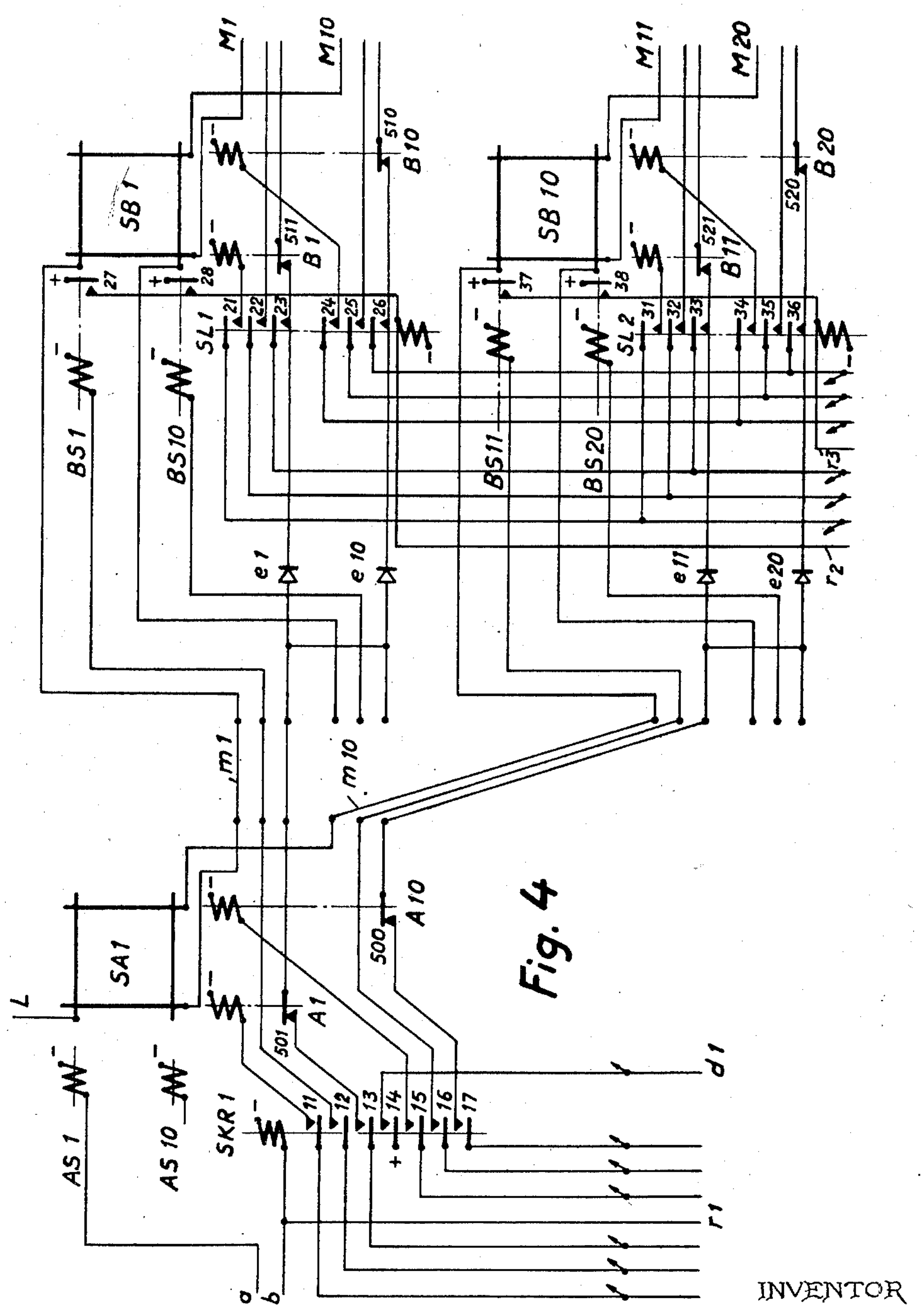
Fig. 4 shows the switching devices for primary and secondary selectors connecting the subscriber's lines L to the intermediate lines M in Fig. 1.

In Fig. 3 the relays LR1—LR10 are the line relays for 10 subscriber's lines L, belonging each to their respective selecting bar AS1—AS10 in the cross bar switch SA1 in Fig. 4. The relays LR1—LR10 constitute a chain, in which only one relay at a time can be attracted. Here is supposed that a circuit for the relay LR10 is closed over the contacts 101, 113, 123 and others and 103 to +, i. e. the positive pole of the exchange battery. The remaining part of the circuit is unimportant for the invention. A group relay GR1—GR10 belongs to each cross bar switch SA1. These group relays as well as the relays LR1—LR10 are coupled in a chain, in which only one relay at a time can be attracted. When relay LR10 attracts its armature, contacts 101—106 are actuated. The circuits of the relays LR1, LR2 a. s. o. are broken by the contact 103. Relay LR10 is self-held over contact 102. The following circuit is completed: +, winding on relay MR1, contacts 46, 51, 53, 203 and others, 223, 213, 211, winding on relay GR1, contact 104, to negative, which is the negative pole of the exchange battery. Relays MR1 and GR1 attract their armatures. Contacts 41—44 and 211—215 are actuated. Contact 213 breaks the make-circuits of the relays GR2—GR10. Relay GR1 is self-held over contact 212. Contacts 41, 42 and 43 break the circuits of the relays MR2, MR4 resp. MR5, a switching operation according to (*c*)-(*e*) above thereby being prevented. Contact 44 closes a circuit over the wire C1 to relay AAG in Fig. 7. Relay AAG attracts its armature, contacts 91—96 close and connect together the relay devices PA0—PA8 of that primary selection stage, to which selector SA1 pertains, and PB1—PB8 of that secondary selection stage, to which selectors SB1—SB10 pertain, with the relay device PC1—PC8 for that selection stage, to which selector RA1 belongs. If one of the relays MR2, MR4 or MR5 has become energized and attracted its armature which occurs in a similar way as for relay MR1, other relays corresponding to relay AAG, would have been actuated over wires C2—C7. The switching operation, which is indicated under (*d*) above and controlled by relay MR2, may be divided into two parts, viz. the connection of an intermediate line M over a link circuit SNR with another intermediate line M and the connection of last mentioned intermediate line M with a called subscriber's line. During the latter part of the switching operation the relay devices of the selection stages GA and GB are not necessary and thus they may be released. This is marked over wire C2 by actuation of relay MR3, which by means of contact 50 interrupts the circuit over wire C4. At the same time contact 59 is closed and thus the connections indicated under (*e*) above and corresponding to relay MR5 may be effected, though the latter part of the switching operation corresponding to relay MR2 has not yet been finished. Contact 58 bridges contact 54 during said latter part of the switching operation.

When relay GR1 attracts its armature the following circuits are completed: +, contacts 214 and 106, wire *b*, winding on relay SKR1, to negative, and: +, contacts 205 and 105, wire *a*, winding on the selecting magnet of the selecting bar AS1, to negative. Said selecting magnet and relay SKR1 attract their armatures. Contacts 11—17 are closed and the contact spring sets of the selecting bar AS1 are indicated in the operating bars A1—A10.

Figure 5:
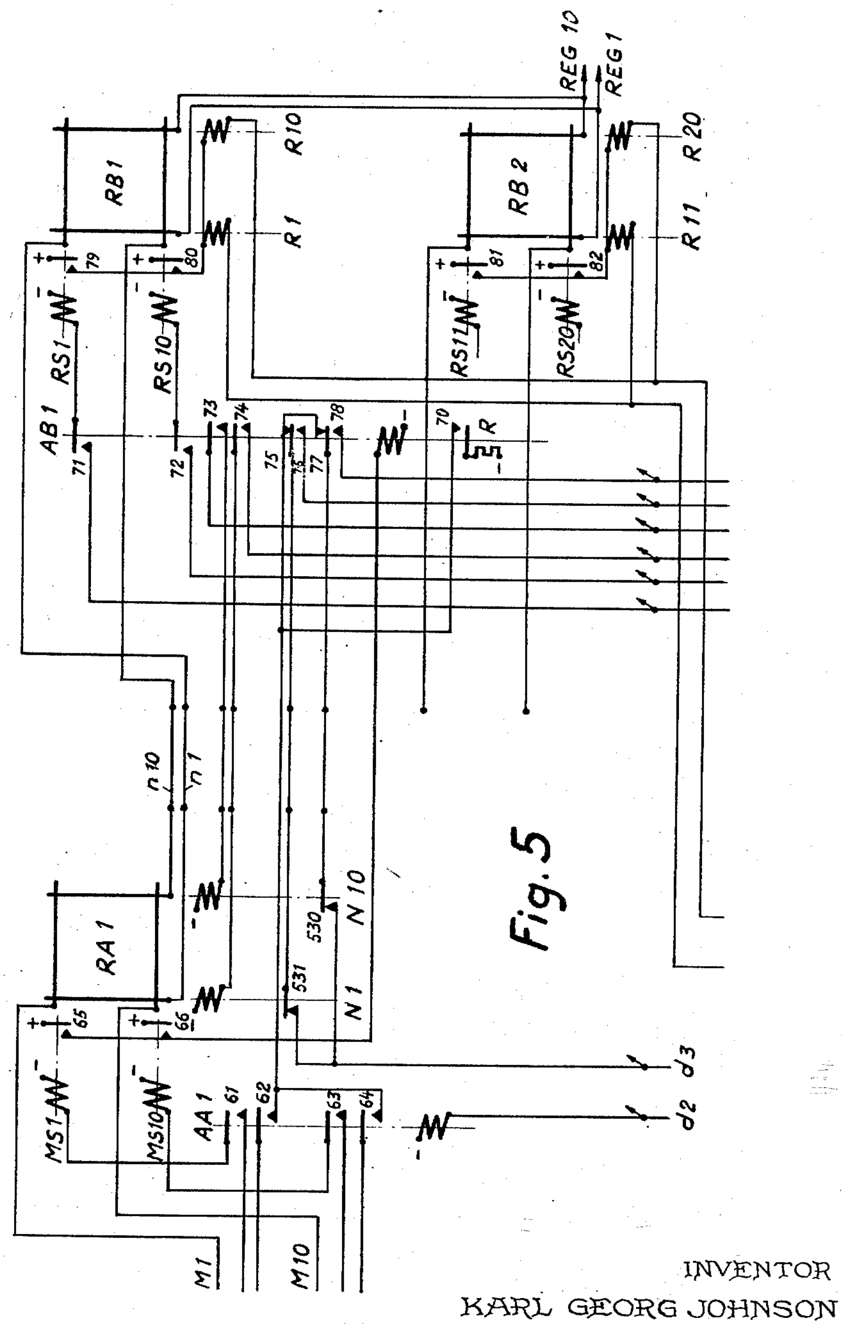
Fig. 5 shows switching devices for those primary and secondary selectors which connect the intermediate lines M to the registers REG in Fig. 1.

Each of the operating bars A1—A10 is connected with its selecting bar BS1, BS11 in Fig. 4 over links *m*1—*m*10, which are also indicated in Fig. 2. Each selecting bar BS1, resp. BS11, has access to 10 operating bars B1—B10 and B11—B20, respectively, each connected over its intermediate line M1—M10 and M11—M20, respectively, to a selecting bar MS1—MS10 in a selector RA. As appears from Fig. 2 all selecting bars AS1—AS10 may be connected to all intermediate lines M. Each of the operating bars N1—N10 in the selector RA1 in Fig. 5 is connected together to its selecting bar RS1—RS10 in the selector RB1 over links *m*1—*m*10, which are also indicated in Fig. 2. Each operating magnet has a contact 501—500, 511—510 and 521—520, respectively, over which a test circuit for selection of a free operating bar is brought. To enable selections by means of many selection stages to occur simultaneously these contacts are so connected as is shown in Fig. 4–5. Contact 501 is connected over the rectifiers *e*1—*e*10 to contacts 511—510, which in their turn are connected together over contacts 62 and 64, respectively, on relay AA1 in Fig. 5. Relay AA1 is energized over wire *d*2 by contact 91 on relay AAG in Fig. 7 and attracts its armature when relay AAG is actuated. For each cross bar switch RA there is a relay corresponding to AA1. Relay AA1 belongs to selector RA1. Due to this the test wires of all free intermediate lines M1—M20 will be connected to a common conductor *d*3, over contacts 531—530 of the operating bars N1—N10 in the cross bar switch RA1 resp. over corresponding contacts in remaining selectors RA, and over break contacts 75 and 77, respectively, in the relays AB, among which only relay AB1 pertaining to selector RB1, is shown in Fig. 5. In this manner another test circuit arises over contact 500, the rectifiers e11—e20, contacts 521—520, the contacts on relays AA10 and AB2, not shown in the figure, to wire d3.

Figure 6:
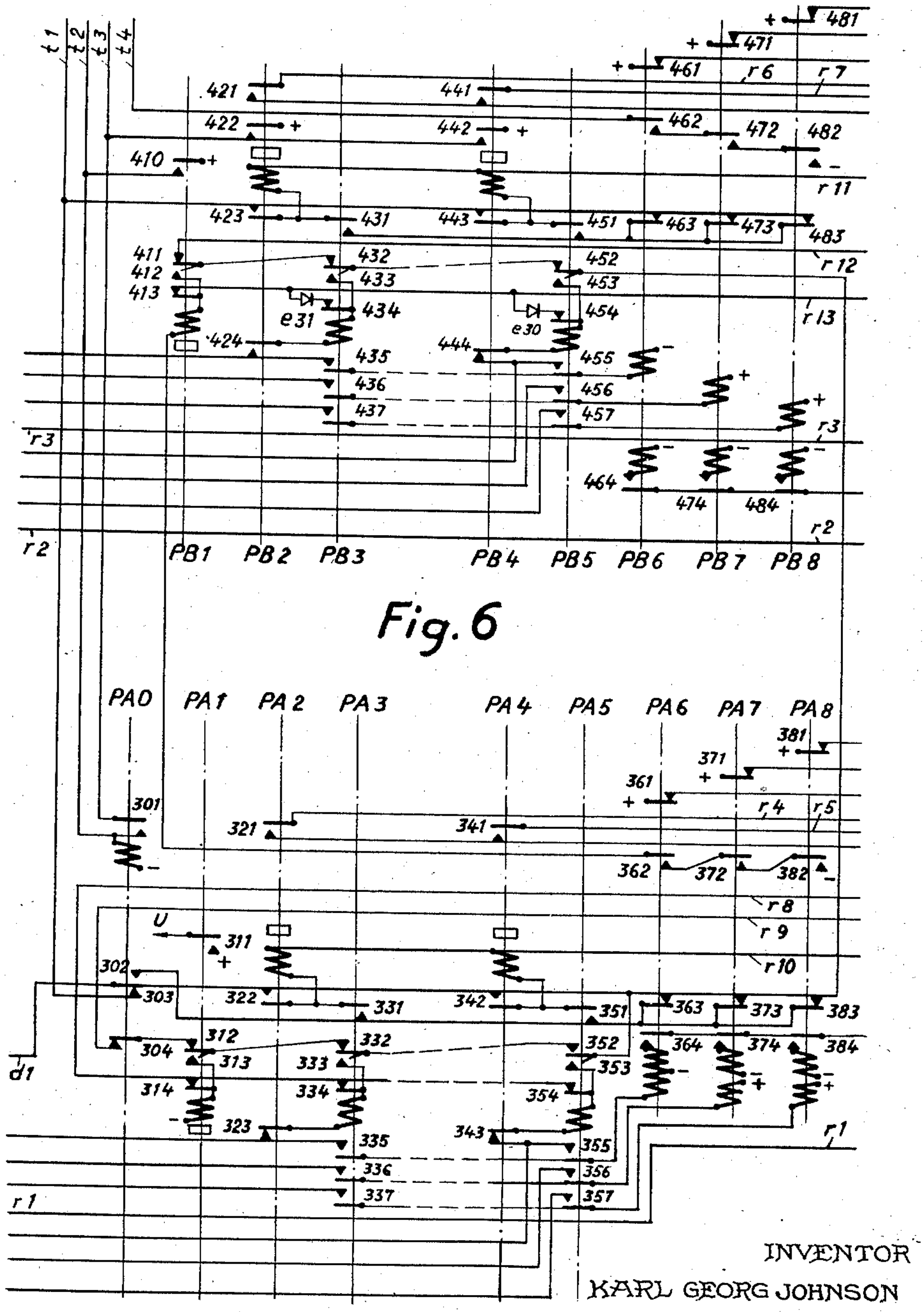
Fig. 6 shows the relay devices for selection of a free operating bar among the primary and secondary selectors in Fig. 4.
Figure 7:
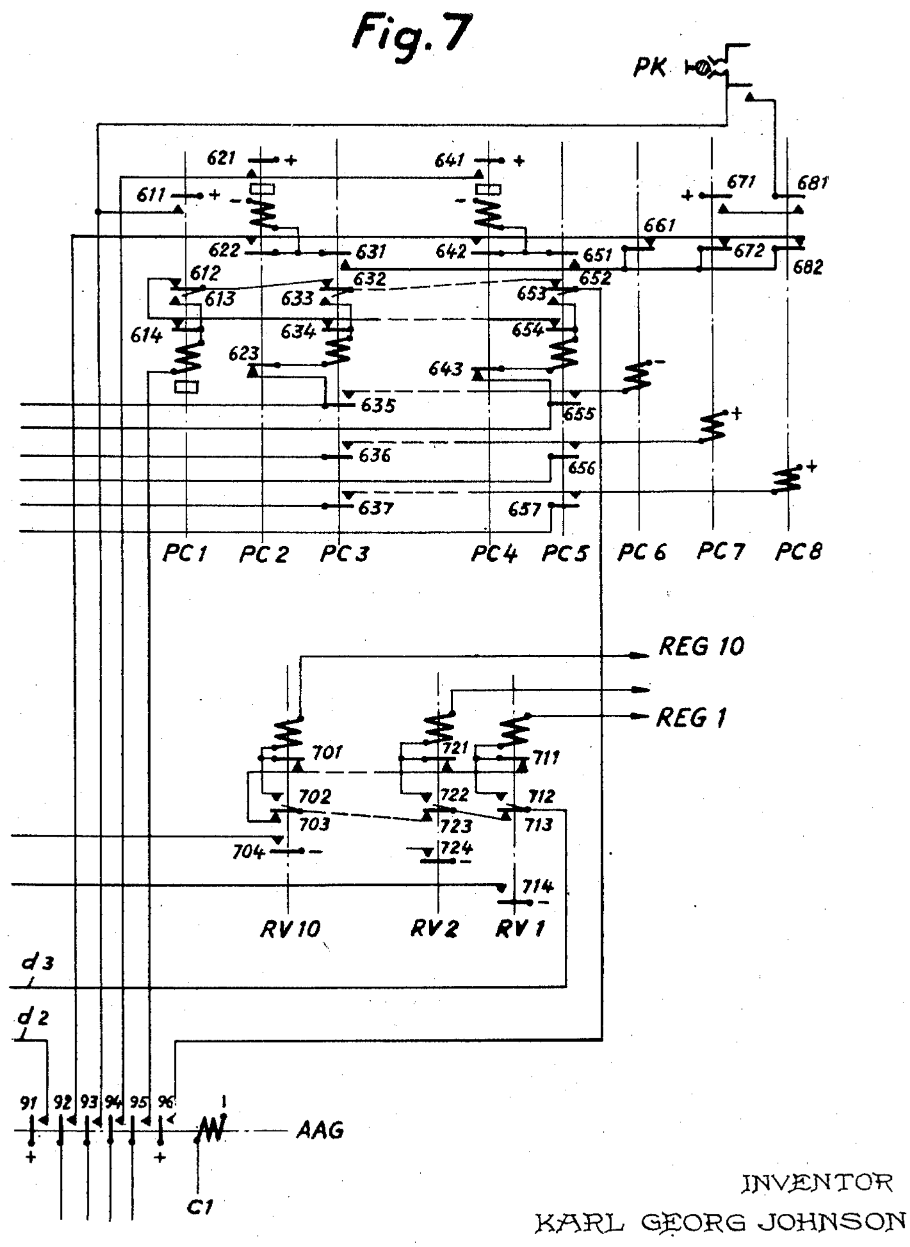
Fig. 7 shows the relay devices for selection of a free operating bar among the primary and secondary selectors in Fig. 5.

All test circuits described above are on one side over contacts 13 resp. 17 on relay SKR1 connected to a relay each, PA3 and PA5, respectively, in a relay device PA0—PA8 in Fig. 6, common to the selectors RA, and on the other side over wire d3 connected to a relay device RV1—RV10 in Fig. 7. When relay SKR1 attracts its armature, the following circuits will arise: +, contact 14, wire d1, contacts 352 and others, 332 and 312, 304, wire r9, contact 815 in Fig. 8, wire r8, the circuits connected in parallel over contacts 334—354, windings on relays PA3—PA5, contacts 323—343, 13—17, 501—509, rectifiers e1—e10 and e11—e20, respectively, contacts 511—510 and 521—520, respectively, 62 and 64 and others, 75 and 77 and others, wire d3, contacts 713—703, the circuits connected in parallel over contacts 711—701, windings on relays RV1—RV10 to negative in those registers REG1—REG10, which are free. One of the relays PA3—PA5, e. g. PA5, and one of the relays RV1—RV10, e. g. RV1, attract their armatures. Contacts 351—357 and 711—714 are actuated. The following circuit is completed: +, winding on relay PA8, contacts 357 and 11, winding on the magnet of the operating bar A1, to negative. Relay PA8 and the magnet of operating bar A1 attract their armatures. Contacts 381—384 and 501 are actuated. Relay PA5 is however self-held in the following circuit: +, contact 14, wide d1, contact 353, winding on relay PA5, contacts 343 and 355, winding on relay PA6 to negative. Relay PA6 is so adjusted that it can not work parallelly with relay RV1, but attracts its armature when contact 501 breaks. Thus contacts 361—364 are actuated. Furthermore the following circuit is completed: +, winding on relay PA7, contacts 356 and 12, winding on the magnet of the selecting bar BS7, to negative. Relay PA7 and the magnet of the selecting bar BS7 attract their armatures. Contacts 371—374 and 27 are actuated.

When the magnet of the operating bar A1 attracts its armature, the selecting bar BS7 is connected over link m1 to the calling line L. Relay PA8 controls that the circuit of magnet to the operating bar A1 was complete and relay PA6 controls that the magnet also attracts its armature. Relay PA7 controls that the circuit of the magnet to the selecting bar BS7 is complete. When contact 27 is closed relay SL1 attracts its armature and contacts 21—26 close. Thus the operating magnets in the selector SB1 are connected to the relay device PB1—PB8, which is common to all cross bar switches SB. The following circuits are completed: +, contact 14, wire d1, contacts 452 and others, 432 and 411, wire r12, contact 805 in Fig. 8, wire r13, the circuits connected in parallel over the rectifiers e31—30, contacts 434—458, windings on relays PB3—PB5, contacts 424—444 and 23—26, and 511—510, the connected contacts 62—64 and 75—77, the contacts 531—539 connected in parallel, wire d3, contact 712, winding on relay RV1, to negative in the register REG1. One of the relays PB3—PB5, e. g. PB3, attracts its armature. Contacts 431—437 are actuated.

The rectifiers e1—e20 prevent that a possible earth fault on one of the connected contacts acts upon the relay chain PA3—PA5. The rectifiers e31—e30 have the same object, however for the relay chain PB3—PB5.

When contacts 436 and 437 close, there is formed partly a circuit through windings on relay PB8 and the magnet to operating bar B10, partly a circuit through a winding on relay PB7 over contacts 436, 25 and 62 and the winding on the magnet to operating bar MS10. Relays PB7 and PB8 and the magnets of the operating bar MS10 attract their armatures. The links m1 is connected to the intermediate line m10. Contacts 471—474, 481—484, 510 and 66 are actuated. When contact 510 breaks, relay PB6 attracts its armature in the following circuit: +, contact 14, wire d1, contacts 452 and others, contact 433, winding on relay PB3, contacts 424 and 435, winding on relay PB6, to negative. Contacts 461—464 are actuated. When contact 66 closes, relay AB1 attracts its armature. Contacts 70—78 are actuated. The circuits of the relays PA5 and PB3 are kept closed over contact 70 and resistance K, contacts 75 and 77 having been actuated. The following circuit is completed: +, contacts 96, 652 and others, 632 and 612, the circuits connected in parallel over contacts 634—654, windings on relays PC3—PC5, contacts 76 and 78 and others, 531—530, wire d3, contact 712, winding on relay RV1, to negative in register REG1. One of the relays PC3—PC5, e. g. PC5, attracts its armature. Contacts 651—657 are actuated. Contacts 656 closes a circuit for relay PC7 and the magnet of the operating bar N1 over contact 74, and contact 657 closes a circuit for relay PC8 and the magnet of the selecting bar RS1 over contact 71. Relays PC7 and PC8 and the magnets of the operating bar N1 and the selecting bar RS1 attract their armatures. The intermediate line M10 is thus connected over link n1 to selecting bar RS1 and contacts 671—672, 681—682, 531 and 79 are actuated. The following circuit is completed: +, contact 79, winding on the magnet to operating bar R1, contact 714 to negative. The magnet of the operating bar R1 attracts its armature, whereby line L in Fig. 4 is connected over operating bar A1, link m1, operating bar B10, intermediate line M10, operating bar N1, link n1 and operating bar R1 to register REG1. In the figures only one conductor is shown for talking wires and holding circuits in the connection between line L and register REG1, although in reality there are two speaking wires and a third conductor for holding of the connection. Over said third conductor are now held the magnets of the operating bars A1, B10, N1 and R1 by means of especial auxiliary windings, not shown on the drawings, and a cut-off relay pertaining to line L breaks the current of relay LR10 in Fig. 3, after which all relays LR10, GR1, MR1, SKR1, SL1, AAG, AA1 and AB1 pertaining to the marker and PA5—8, PB3, PB6—8, PC5—8 and RV1 release their armatures.

As is mentioned above for relays PA6—PA8 the relays PA6—PA8, PB6—PB8 and PC6—PC8 are controlling the switching operation during the set-up of the communication. Relays PA8, PB8 and PC7 control that the circuit of the magnet of the selected operating bar is complete, relays PA7, PB7 and PC8 control that circuit n for corresponding selecting magnet is complete while relays PA6, PB6 and PC6 control that the operating magnets attract their armatures.

If there is no free operating bar in one of the selection stages, e. g. contact SA1, relay PA1 attracts its armature in the following circuit: +, 14, wire dI, contacts 352 and others, 332, 312 and 304, wire r9, contact 815, wire r8, contact 314, winding on relay PA1 to negative. Contacts 311—314 are actuated. Contact 312 interrupts the test and contact 311 connects + to wire U for indication of busy condition. The continued course of events at busy condition is unimportant for this invention.

If one of the relays PA3 or PA5, e. g. PA5, attracts its armature, the circuit of the relay PA1 is broken by contact 352 and the following circuit is completed: +, contact 14, contacts 363, 373, and 383 connected in parallel, contact 351, winding on relay PA4, wire r10, winding on relay PA in Fig. 8, to negative. The relays PA4 and FA as well as relay PA1, as is described above, are slow-releasing. If the operating bar, selected by operation of the relay PA5, is faultless, the relays PA6—PA8 will attract their armatures and break contacts 363, 373 resp. 383. If, on the contrary, there is some fault, the circuit of the relays PA4 and FA are not broken, but these attract their armatures. Contacts 341—343 and 811—810 are actuated. Relay PA4 is self-held over contact 342 and breaks the current of relay PA5, which releases its armature, so that the test circuit for the other relays, e. g. PA3, is again closed. If the operating bar A10, connected to relay PA3, is free, relay PA3 attracts its armature and the switching operation continues according to the description above.

Figure 8:
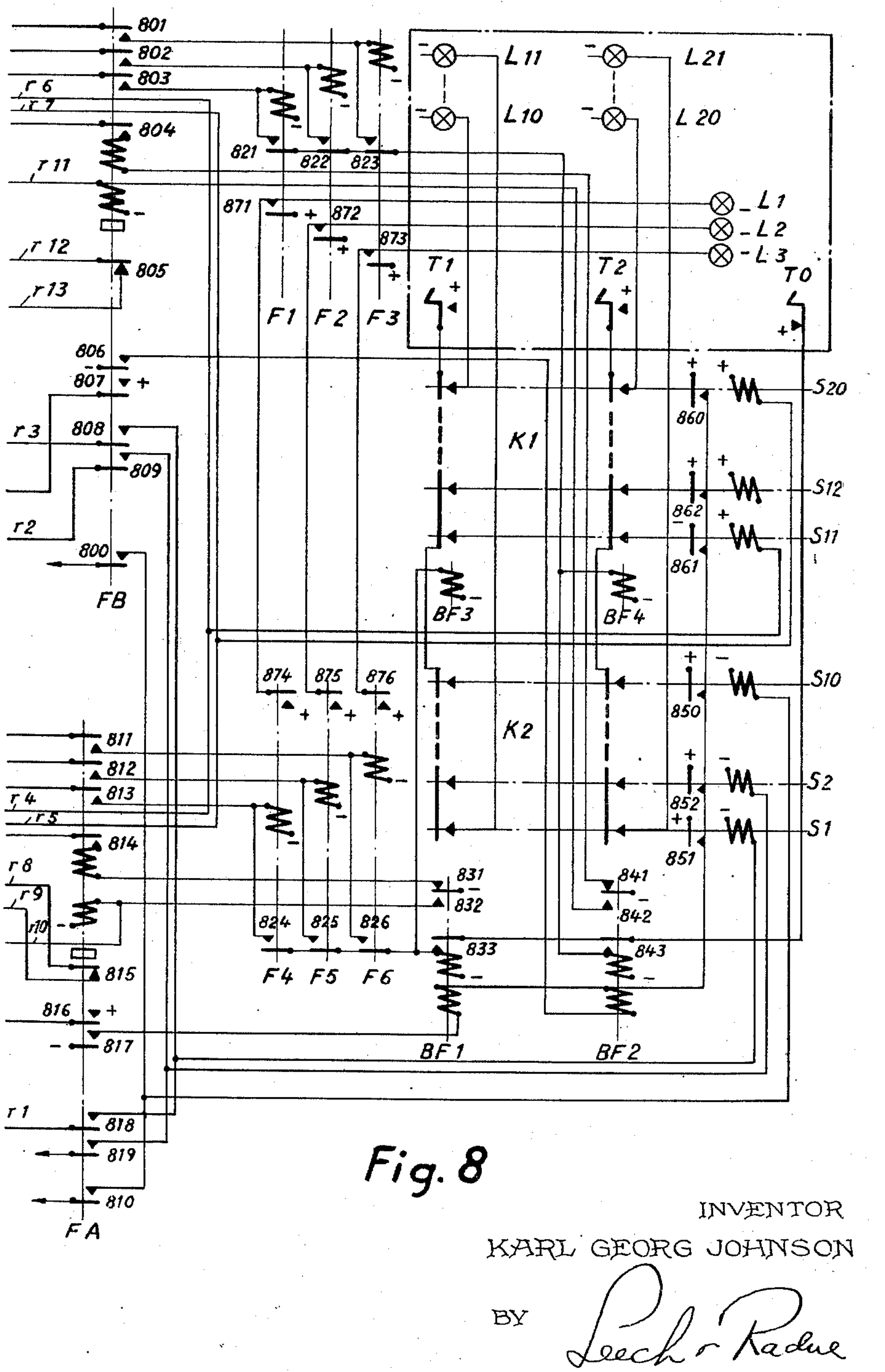
Fig. 8 shows connection relays and registering devices for a trouble indicator.

Contact 341 closes the following circuit: +, winding on the magnet of the selecting bar S20 in Fig. 8, wire r5, contact 341, contact 814, winding on relay FA, contact 831, to negative. The selecting bar S20 pertains to a cross bar switch K1, which together with another cross bar switch K2, belongs to a trouble indicator used for registration of faults. The magnet of the selecting bar S20 attracts its armature. Contact 860 is closed. Simultaneously the magnet of the selecting bar S1 in the cross bar switch K2 attracts its armature in the following circuit: +, contact 214 in Fig. 3, contact 106, wire b, wire r1, contact 818 in Fig. 8, winding on the magnet for selecting bar S1, to negative. Contact 851 is closed and the magnet of the operating bar BF1 attracts its armature in a circuit over contact 817. Contacts 831—833 are actuated, the magnet of the operating bar BF3 attracts its armature, when contact 833 is closed, in the following circuit, which also serves for holding of the operating bar BF1: +, push button T0, contact 833, windings on the magnets of the operating bars BF1 and BF3. During above described switching operation also one of the relays F4—F6 has attracted its armature, as the contacts 811—813 have been closed and none of the contacts 361, 371 or 381 has been broken. If relay F4 is supposed to attract its armature, contacts 824, and 874 will be closed. Relay F4 is self-held over contact 824. The lamp L1 is lighted over contact 874 and indicates that there is some fault.

As appears from the description above the communication from the calling line L is changed from the faulty operating bar A1 to operating bar A10 by relay PA5 being broken away by relay PA4. When contacts 831—832 have been actuated, relay FA in Fig. 8 releases, but the fault registration on the cross bar switches K1 and K2 is held until the push button T0 is pressed. When one of the lamps L1—L3 is lighted, the fault is localized by pressing the push buttons T1—T2. When T1 is pressed, two lamps among the lamps L10—L11 are lighted. The lamp row L10—L11 indicates that the fault is in the selection stage SA, the lamp L11, that it is in the selector SA1, and lamp L10, that the fault is in the operating bar A1. In order not to make one lamp per operating bar necessary, one can combine 20 lamps so, that L11—L10 are connected to one contact each on all the operating bars in the cross bar switch K2 and the lamps L21—L20 to one contact each on all the operating bars in the cross bar switch K2 and the lamps L21—L20 to one contact each on all the operating bars in the cross bar switch K1. The pressing of the button T1 then indicates the selection stage SA, the lamp L11, selector SA1 and lamp L21 in combination with L11 the operating bar A1. The lamps L11—L10, and L21—L20, L1—L3 and T1—T2 and T0 pertain to a control place in the automatic exchange.

If now it is supposed that no fault is found in the selection stage SA, but a faulty operating bar is selected in the selection stage SB, e. g. by the relay PB3, relay PB2 will attract its armature due to current over contact 431, one of the contacts 463, 473 or 483, contact 303, wire dI and contact 14 as is described above for relay PA4. Contacts 421—424 are actuated. Relay PB3 releases its armature. The relay FB in Fig. 8 attracts its armature and the fault is registered on the operating bars for cross bar switches BF2 and BF4 and the relays F1—F3 in accordance with the description above for relay FA. The wires r2 and r3 combine herewith the relays SL1 and SL2 with the magnets of the selecting bars S1—S10.

If it is further supposed that there is no other free and faultless operating bar in the selector SB1 selected in the selection stage SA, the relay PB1 will attract its armature in the following circuit: +, contact 14 in Fig. 4, wire dI, contacts 452—411, wire r12, contact 805, wire r13, contact 413, winding on relay PB1, contacts 362, 372 and 382, to negative. Contact 805 is namely closed again when relay FB is released due to the fact that contacts 841—843 are actuated. By connecting negative to wire r11 over contact 842 the relay PB2 is retained until the switching operation is finished, when + from contact 14 on relay SKR1 is switched away, while relay FB is caused to release its armature. Relay PB1 is slow-releasing and may be replaced by a time device, e. g. a stepping relay or a thermocontact. Contacts 410—413 are actuated. Relay PB1 is self-held over contact 412. Contact 410 closes a circuit for relay PA0, which attracts its armature and is self-held over contacts 301 and 422. Contact 303 breaks the current of relay PB1, which again releases its armature. Contact 302 closes the following circuit: +, contact 14, wire dI, contacts 302 and 351, winding on relay PA4, wire r10, winding on relay FA, to negative. Relay PA4 attracts its armature. Contact 343 breaks the current of relay PA5, which releases its armature. Relays PA6—PA8 release their armatures. Contacts 362, 372 and 382 break the current of relay PB1 which releases its armature. Contact 410 breaks the current of relay PA0, which releases its armature. Contact 304 is again closed. The relay chain PA3—PA5 selects a new operating bar in the selector SA. Relay SL1 releases its armature and a new selector SB, e. g. SB10, is connected by relay SL2 to the relay device PB1—PB8. The complete switching operation is thus remade from the very beginning on avoiding the operating bar A1 which has proved not to be able to perform the communication.

The relay device PC1—PC8 works quite anologously to the relay device PB1—PB8 in Fig. 6. Relay PC1 is a time device, starting with current over contact 95, when negative is connected to wire $t4$ over contacts 462, 472 and 482, which proves that the selection in the selection stage SB has been completed faultlessly. At the same time the relay device PC1—PC8 should be connected over a relay AB in Fig. 5 to the operating bars in a selector RB, whereby one of the relays PC3—PC5 is to attract its armature and break the circuit of the relay PC1. If so does not occur or the circuit of the relay PC1 is again closed upon actuation of one or more of the relays PC2—PC4, the relay PC1 will attract its armature. Contacts 611—614 are closed. The following circuit is closed: +, contacts 611 and 93, wire $t2$, winding on relay PA0, to negative. Relay PA0 attracts its armature and is self-held over contact 301, wire $t3$, contact 94 and one of the contacts 621—641 if one of the relays PC2—PC4 has attracted its armature. Relay PA0 breaks down the whole connection as is described above and a completely new communication is commenced, when all the relays in the relay devices PB1—PB8 and PC1—PC8 have released their armatures.

The relay device PC1—PC8 pertains to the last selection stage in a switching operation and is of course connected to the fault-indicating device according to Fig. 8 in the same manner as the relay devices PB1—PB8, although this is not indicated on the drawings. In Fig. 7 push button PK is shown, which is pressed if a great number of test connections through the automatic exchange is desired. When a communication is set up, the relays PC7 and PC8, attract, a circuit from + over contacts 671, 681, push button PK, contact 93 and wire $t2$ thus being formed for relay PA0, which attracts its armature and actuates the relay device PA1—PA8 so, that the connection is disconnected, a new one is set up over other connection paths. In this manner all operating bars for cross bar switches in the automatic exchange may be tested swiftly. If there is some fault this is marked on the lamps L1—L3 and the cross bar switches K1 and K2 in Fig. 8.

I claim:

1. In an automatic telephone system in combination, cross-bar switches, a plurality of selection stages connected in series, each of said selection stages having operating bars in said cross-bar switches, an operating magnet with a break contact for each of said operating bars, a set of relays for each of said selection stages, test relays in each of said sets building a chain of relays connected for operation singly only, a first one of said selection stages, a trunk available in a number of operating bars in said first selection stage, a test circuit including said break contact for each operating bar in said first selection stage, means connecting said test circuits to said test relays for said first selection stage by a call on said trunk, a second one of said selection stages, links connecting said operating bars in said first selection stage to said second selection stage, each of said links being available in a number of operating bars in said second selection stage, a test circuit including said break contact for each operating bar in said second selection stage, means connecting said last mentioned test circuits to said test relays for said second selection stage when one operating bar in said first selection stage with the corresponding link is selected by a test relay for said first selection stage, a time measuring device, contacts in the relay set for said first selection stage closing a circuit starting the timing operation of said time measuring device when an operating bar is selected by a test relay of said first selection stage, contacts in the relay set for said second selection stage breaking said circuit and preventing operation of said time measuring device when one of said test relays in said second selection stage operates, and means actuated by the expiration of a predetermining time interval fixed by said time measuring device, when operated, for releasing the operating bar selected in said first selection stage and causing selection of another operating bar in said first selection stage.

2. An automatic telephone system as set forth in claim 1 comprising a trouble indicator, means actuated by said time measuring device at the end of said interval for connecting said relay set for said first selection stage to said trouble indicator, and contacts on said test relays for identifying the first selected operating bar in said first selection stage on said trouble indicator.

3. An automatic telephone system as set forth in claim 1 comprising routing relays, at least one of said routing relays operating by said call and interconnecting said set of relays for said first selection stage with the set of relays for said second selection stage.

KARL GEORG JOHNSON.

REFERENCES CITED

The following references are of record in the file of this patent:

UNITED STATES PATENTS

| Number | Name | Date |
|---|---|---|
| 1,593,387 | Clark | July 20, 1926 |
| 1,659,083 | Clark | Feb. 14, 1928 |